Sept. 18, 1951  L. MACHA, JR  2,568,647
DRAFTING INSTRUMENT
Filed Feb. 7, 1948
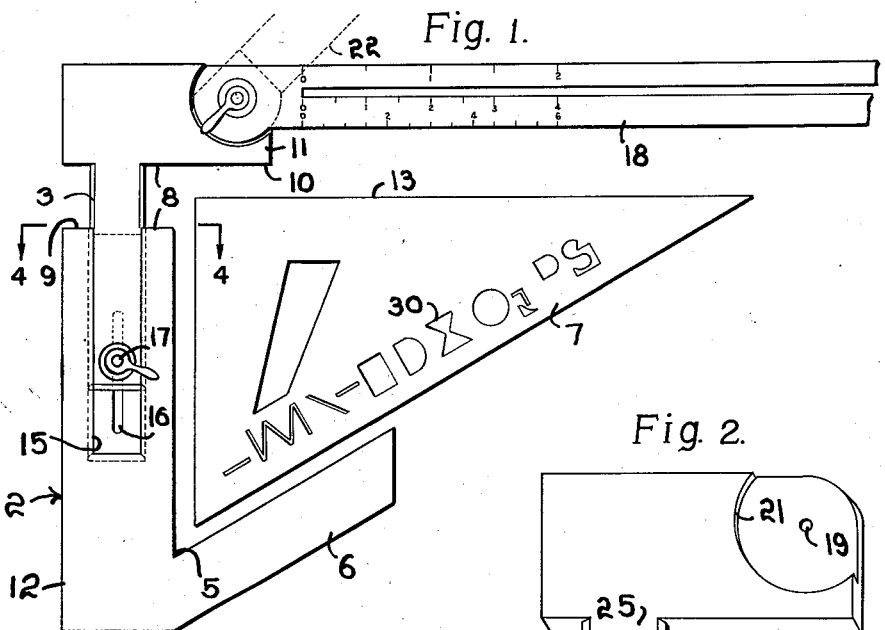
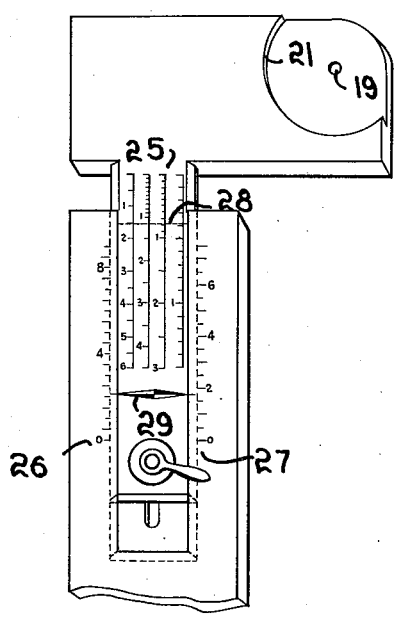
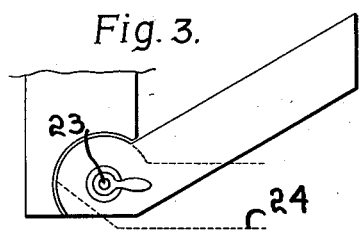
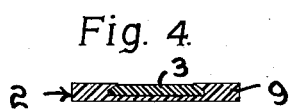
LOUIS MACHA JR.
INVENTOR
BY  *Lester B. Clark*
&  *Ray L. Smith*
ATTORNEYS Patented Sept. 18, 1951

2,568,647

UNITED STATES PATENT OFFICE 2,568,647

DRAFTING INSTRUMENT

Louis Macha, Jr., Houston, Tex.

Application February 7, 1948, Serial No. 6,872

2 Claims. (Cl. 33—108)

The invention relates to a drafting instrument and in particular to an instrument for plotting spaced lines, distances and the like.

Heretofore when a draftsman, architect, or engineer has plotted or marked off spaced parallel points or lines, it has been customary to use a T-square with a triangle or similar straight edge. One point, or line is marked, and the straight edge moved and then the second line or point is marked.

This procedure is disadvantageous since it is almost impossible to maintain an even spaced distance between the lines or points. Furthermore, much additional time is required in manipulating a T-square and a triangle and if one or the other of the devices slip while being used, then the remaining positions are thrown out of line.

A primary object, therefore, of the present invention is to provide a drafting instrument which obviates the aforementioned difficulties.

Another object of the invention is to provide a device for marking off spaced parallel lines with a minimum of manipulation of the device.

Still another object of the invention is to provide a drafting instrument for marking off spaced parallel lines which instrument has a scale thereon to denote and maintain a spaced distance between the lines.

A further object of the invention is to provide a drafting instrument for drawing a plurality of spaced parallel lines at any selected angle.

A still further object of the invention is to provide an instrument which requires a minimum of manipulation in use.

Yet a further object of the invention is to provide a drafting instrument for use in marking off parallel lines which can be easily manufactured and is simple and inexpensive in construction.

Other and further objects and advantages of the invention will become more readily apparent from a consideration of the following description and drawing wherein:

Fig. 1 is a top plan view illustrating the preferred embodiment of the invention;

Fig. 2 is a top plan fragmentary view of Fig. 1 enlarged and showing a scale arrangement on the device;

Fig. 3 is a top plan fragmentary view of Fig. 1 showing an alternate embodiment therein;

Fig. 4 is a sectional view on the line 4—4 of Fig. 1.

In Fig. 1 the device is shown as comprising a triangular shaped body generally denoted at 2 with the slide 3 arranged thereon. A recessed angle 5 which is less than 90° is formed between the intersection of the body 2 and the arm or lateral projection 6 which angle is adapted to receive a plate or member 7 therein.

By positioning the slide 3 a distance 8, as illustrated in Fig. 1, from the end 9 of the body 2, there will be a space between the edge 10 of the lateral projection or arm 11, and the edge 13 of the member 7. It is to be noted, as shown in the drawings, the lateral projection or arm 11 intersects the base 12 of the body 2 at a 90° angle.

The member 7 may be then moved to contact the projection 11 along its edge 10 and a line drawn along the edge 13 of the member 7. By holding the body 2 stationary and sliding the member 7 to contact the projection, a second line can then be drawn along the edge 13 which will be spaced from and parallel to the first line drawn.

The operation can be continued and the body 2 and member 7 moved stepwise to mark, or denote, any number of spaced parallel positions.

The slide 3 is integrally connected with the projection 11 and is positioned in a guide 15 in the base 12 of the body 2 which is provided with suitable means such as the slot 16 therein to receive the clamp 17 which releasably engages the slide 3. In this manner the slide 3 can be positioned at selected predetermined points in the guide 15 so that the projection 11 thereon will be a spaced distance from the end 9 of the body 2.

The projection 11 may be provided with an extension thereon as shown at 18, which is removably secured at 19 to such projection. The projection 11 and extension 18 are cut away as illustrated at 21 so that their nether surfaces will be substantially in the same plane. As illustrated in dotted line at 22 the extension may be set at any selected angle.

Similarly the projection 6 can be pivotally mounted on the body 2 as illustrated in Fig. 3. Suitable clamp means 23 are used to retain the projection in various predetermined positions as illustrated in dotted line at 24.

Parallel lines, or positions, of various angles can be obtained by arranging the extension 18 and projection 6 at the desired angle and using the device as previously described.

The slide and guide are shown in Fig. 2 as being graduated whereby the distance between the parallel lines or positions can be predetermined. It is to be noted that a plurality of scales are shown at 25 on the slide 3 and the guide is graduated along its sides at 26 and 27. The graduations can be to any suitable scale, and with the arrangement shown the line 28 can be used to read the scales 25 on the slide 3 while the pointer 29 is used to read scales 26 and 27. In this manner a greater number of scales can be put on the device without making it unduly large.

A plurality of cutouts are shown at 30 in the member 7. These cutouts can be used to make the letters of the alphabet by combining and rearranging to form various parts of each of the letters.

The device shown in the drawing can be made of any suitable material and is preferably made of plastic or other transparent material, additionally, the angle 5 in the body 2 can be of any suitable number of the degrees, the size shown being merely illustrative of the invention.

The invention has been found to be quite adaptable in work such as sectional cross-hatching, drawing sidewalks, railroad lines, marking off a plurality of positions on paper, and many other uses.

Broadly the invention contemplates a drafting instrument for plotting spaced parallel distances.

What is claimed is:

1. A device for drawing parallel lines at an equal given distance apart comprising, a triangular shaped body having a base with two lateral projecting arms extending therefrom, one of said arms intersecting said body at an angle less than 90° and the other arm intersecting said body at a 90° angle, said last mentioned arm being movable laterally of said body to maintain a predetermined spaced relationship between the point of intersection of said body and said last mentioned arm, and a triangular shaped member interfitting with said body against said base and between said arms whereby said member can be moved against one of said laterally projecting arms to make a line along said member and then moving said member against the other of said arms to mark a second line along said member parallel to said first mark, and an extension pivotally secured on said 90° arm whereby a mark can also be made along said extension and along said arm which intersects said body at an angle less than 90°.

2. A device for drawing parallel lines at an equal given distance apart comprising, a triangular shaped body having a base with two lateral projecting arms extending therefrom, one of said arms intersecting said body at an angle less than 90° and the other arm intersecting said body at a 90° angle, said last mentioned arm being movable laterally of said body to maintain a predetermined spaced relationship between the point of intersection of said body and said last mentioned arm, and a triangular shaped member interfitting with said body against said base and between said arms whereby said member can be moved against one of said laterally projecting arms to make a line along said member and then moving said member against the other of said arms to mark a second line along said member parallel to said first mark, said base being movable along a straight edge whereby a plurality of parallel lines may be stepwise formed, and an extension pivotally secured on said 90° arm whereby a mark can also be made along said extension and along said arm which intersects said body at an angle less than 90°.

LOUIS MACHA, Jr.

REFERENCES CITED

The following references are of record in the file of this patent:

UNITED STATES PATENTS

| Number | Name | Date |
| --- | --- | --- |
| 1,505,873 | D'Eramo | Aug. 19, 1924 |
| 2,392,615 | Price | Jan. 8, 1946 |

FOREIGN PATENTS

| Number | Country | Date |
| --- | --- | --- |
| 66,775 | Germany | Jan. 26, 1893 |
| 357,561 | Germany | Aug. 25, 1922 |